US012451047B2

(12) United States Patent
Park et al.

(10) Patent No.: US 12,451,047 B2
(45) Date of Patent: Oct. 21, 2025

(54) DISPLAY DEVICE AND METHOD OF DRIVING THE SAME

(71) Applicant: Samsung Display Co., LTD., Yongin-si (KR)

(72) Inventors: Dong Wan Park, Yongin-si (KR); Joong Hyun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/731,250

(22) Filed: Jun. 1, 2024

(65) Prior Publication Data

US 2025/0131867 A1 Apr. 24, 2025

(30) Foreign Application Priority Data

Oct. 23, 2023 (KR) ........................ 10-2023-0142363

(51) Int. Cl.
*G09G 3/20* (2006.01)
*G09G 3/3233* (2016.01)

(52) U.S. Cl.
CPC ......... *G09G 3/2092* (2013.01); *G09G 3/3233* (2013.01); *G09G 2300/0819* (2013.01); *G09G 2300/0842* (2013.01); *G09G 2300/0861* (2013.01); *G09G 2320/0233* (2013.01); *G09G 2320/0247* (2013.01)

(58) Field of Classification Search
CPC .. G09G 3/2092; G09G 3/3266; G09G 3/3291; G09G 3/3233
See application file for complete search history.

(56) References Cited

U.S. PATENT DOCUMENTS

| | | | | |
|---|---|---|---|---|
| 2015/0015617 | A1 | 1/2015 | Yeo et al. | |
| 2019/0057650 | A1* | 2/2019 | Choi | G09G 3/3233 |
| 2022/0028333 | A1 | 1/2022 | Jeong et al. | |
| 2023/0335045 | A1* | 10/2023 | Hu | G09G 3/32 |

FOREIGN PATENT DOCUMENTS

| | | | |
|---|---|---|---|
| KR | 1020150006723 | A | 1/2015 |
| KR | 1020220096757 | A | 7/2022 |

OTHER PUBLICATIONS

Extended European Search Report dated Mar. 20, 2025, issued in European Patent Application No. 24206144.8 (translation) 18 pages.

* cited by examiner

*Primary Examiner* — Sardis F Azongha

(74) *Attorney, Agent, or Firm* — CANTOR COLBURN LLP

(57) ABSTRACT

A display device includes: pixels each connected to a corresponding scan signal among scan lines, a corresponding data line among data lines, and a corresponding emission control line among emission control lines; and an emission driver which supplies an emission control signal to the emission control lines. The emission control signal includes a first emission control signal having a first width and a second emission control signal having a second width during an active area of one frame.

20 Claims, 14 Drawing Sheets

<WP>

<MP>

DISPLAY DEVICE AND METHOD OF DRIVING THE SAME

The application claims priority to Korean patent application No. 10-2023-0142363, filed on Oct. 23, 2023, and all the benefits accruing therefrom under 35 U.S.C. § 119, the content of which in its entirety is herein incorporated by reference.

BACKGROUND

1. Field

The disclosure generally relates to a display device and a method of driving the same.

2. Description of the Related Art

With the development of information technologies, the importance of a display device which is a connection medium between a user and information increases. Accordingly, display devices such as a liquid crystal display device and an organic light-emitting display device are increasingly used.

A high-speed driving function of providing users with images changed at a high frame frequency and a low-speed driving function of providing users with images changed at a low frame frequency are desired in recent display devices. A method capable of providing images with similar luminances and minimizing flickers when a display device is driven at a high frequency and a low frequency is desired.

SUMMARY

Embodiments provide a display device and a method of driving the same, which may minimize a luminance difference in one frame.

Embodiments also provide a display device and a method of driving the same, which may minimize a luminance difference when the display device is driven at a relatively high frequency and a relatively low frequency.

In an embodiment of the disclosure, there is provided a display device including: pixels each connected to a corresponding scan line among scan lines, a corresponding data line among data lines, and a corresponding emission control line among emission control lines; and an emission driver which supplies an emission control signal to the emission control lines, where the emission control signal includes a first emission control signal having a first width and at least one second emission control signal having a second width during an active area of one frame.

In an embodiment, the emission driver may supply the first emission control signal during a writing period in which a data signal is supplied to the pixels in the active area, and supply the second emission control signal during a period except the writing period in the active area.

In an embodiment, the second width may be set as a relatively wide width as compared with the first width.

In an embodiment, the emission driver may further supply a third emission control signal having a third width during the period except the writing period in the active area.

In an embodiment, the third width may be set as a relatively wide width as compared with the first width, and the second width and the third width may be set as widths equal to or different from each other.

In an embodiment, the second emission control signal may be supplied as a second active area emission control signal in the active area, and the third emission control signal may be supplied as a fourth active area emission control signal in the active area.

In an embodiment, the second emission control signal may be supplied as a second active area emission control signal in the active area, and the third emission control signal may be supplied as a third active area emission control signal in the active area.

In an embodiment, the display device may further include a timing controller which controls the emission driver. The timing controller may include a storage unit in which information of the first width, the second width, and the third width is stored.

In an embodiment, the timing controller may further include a luminance determiner which determines a luminance in a unit of the one frame, corresponding to input data.

In an embodiment, the timing controller may change positions at which the second emission control signal and the third emission control signal are supplied, corresponding to the luminance.

In an embodiment, when the luminance of the one frame is determined as a relatively high luminance, the timing controller may supply the second emission control signal as a second active area emission control signal in the active area, and supply the third emission control signal as a third emission control signal in the active area.

In an embodiment, when the luminance of the one frame is determined as a relatively low luminance, the timing controller may supply the second emission control signal as a third active area emission control signal in the active area, and supply the third emission control signal as a fourth active area emission control signal in the active area.

In an embodiment, the timing controller may change widths of the second emission control signal and the third emission control signal, corresponding to the luminance.

In an embodiment, the timing controller may increase the widths of the second emission control signal and the third emission control signal when the luminance of the one frame is determined as a relatively high luminance, and decrease the widths of the second emission control signal and the third emission control signal when the luminance of the one frame is determined as a relatively low luminance.

In an embodiment, the second width may be set as a width narrower than the first width, and the emission driver may supply the first emission control signal in a predetermined cycle during an active area and a blank area of one frame.

In an embodiment, the display device may further include a timing controller which controls the emission driver, and the timing controller may change a position at which the second emission control signal is supplied in a unit of at least one frame.

In an embodiment of the disclosure, there is provided a method of driving a display device including a pixel of which emission time is controlled corresponding to an emission control signal, the method including: supplying an emission control signal having a first width and an emission control signal having a second width different from the first width during an active area of one frame; and supplying the emission control signal having the first width during a blank area of the one frame.

In an embodiment, the second width may be set as a relatively wide width as compared with the first width.

In an embodiment, a length of the second width may be changed corresponding to a luminance of the one frame.

In an embodiment, the emission control signal having the first width may be supplied in a predetermined cycle in the active area and the blank area. The second width may be set as a width narrower than the first width, and a position at which the emission control signal having the second width is supplied may be changed in a unit of at least one frame.

BRIEF DESCRIPTION OF THE DRAWINGS

Embodiments will now be described more fully hereinafter with reference to the accompanying drawings.

DETAILED DESCRIPTION

Figure 1:
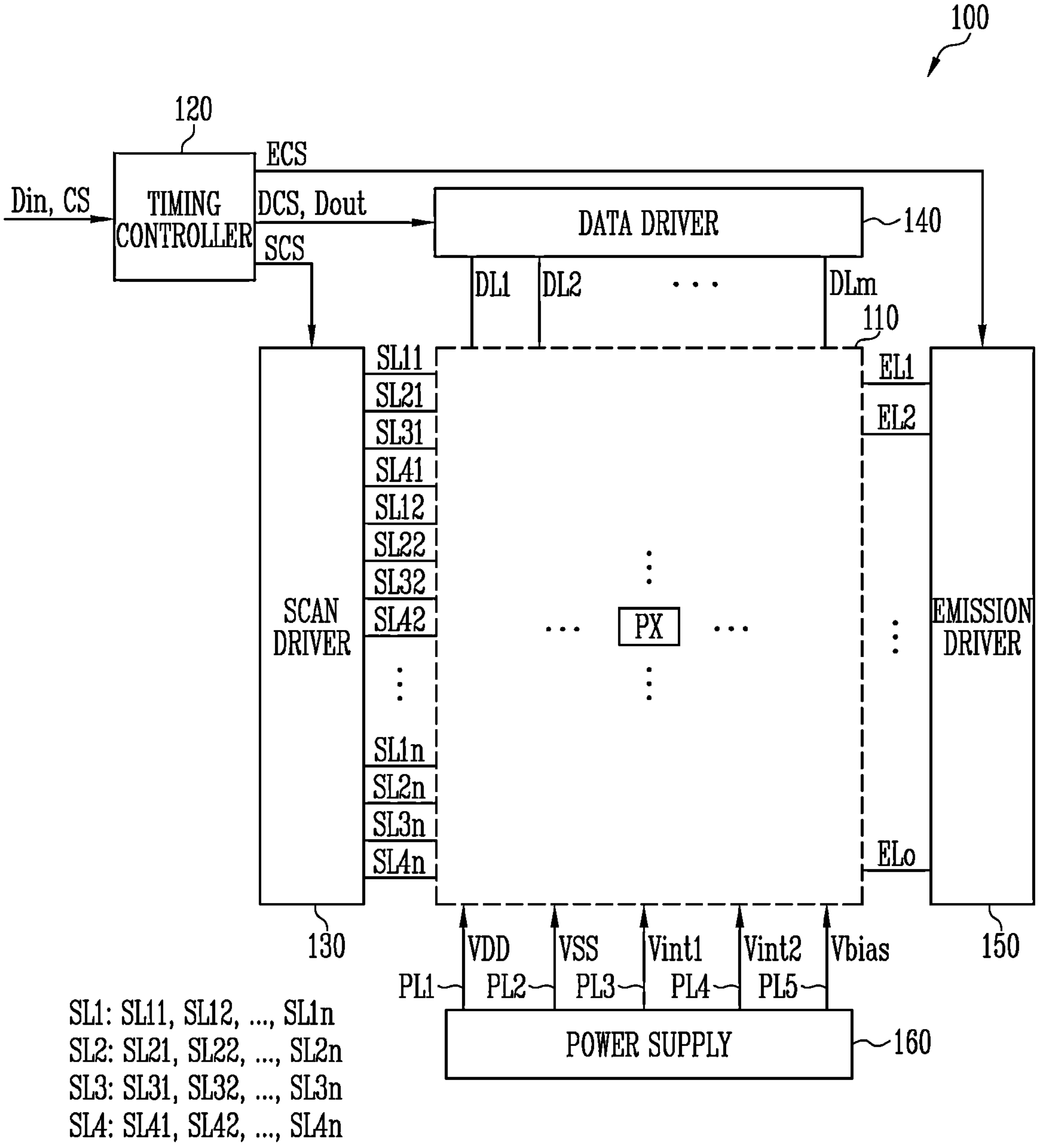
FIG. 1 is a diagram illustrating an embodiment of a display device in accordance with the disclosure.

Hereinafter, embodiments are described in detail with reference to the accompanying drawings so that those skilled in the art may easily practice the disclosure. The disclosure may be implemented in various different forms and is not limited to the embodiments described in the specification.

A part irrelevant to the description will be omitted to clearly describe the disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the disclosure is not limited thereto. Thicknesses of several portions and regions are exaggerated for clear expressions.

In description, the expression "equal" may mean "substantially equal." That is, this may mean equality to a degree to which those skilled in the art may understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by semiconductor-based manufacturing techniques or other manufacturing techniques. In the case of blocks, units, and/or modules implemented by microprocessors or other similar hardware, the units, and/or modules are programmed and controlled by software, to perform various functions discussed in the disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the disclosure. Also, in some embodiments, the blocks, the units, and/or the modules may be physically separated into more complex blocks, more complex units, and/or more complex modules without departing from the scope of the disclosure.

The term "connection" between two components may include both electrical connection and physical connection, but the disclosure is not necessarily limited thereto. For example, the term "connection" used based on circuit diagrams may mean electrical connection, and the term "connection" used based on cross-sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the disclosure.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The disclosure is not limited to embodiments disclosed below, and may be implemented in various forms. Each embodiment disclosed below may be independently embodied or be combined with at least another embodiment prior to being embodied.

Figure 2:
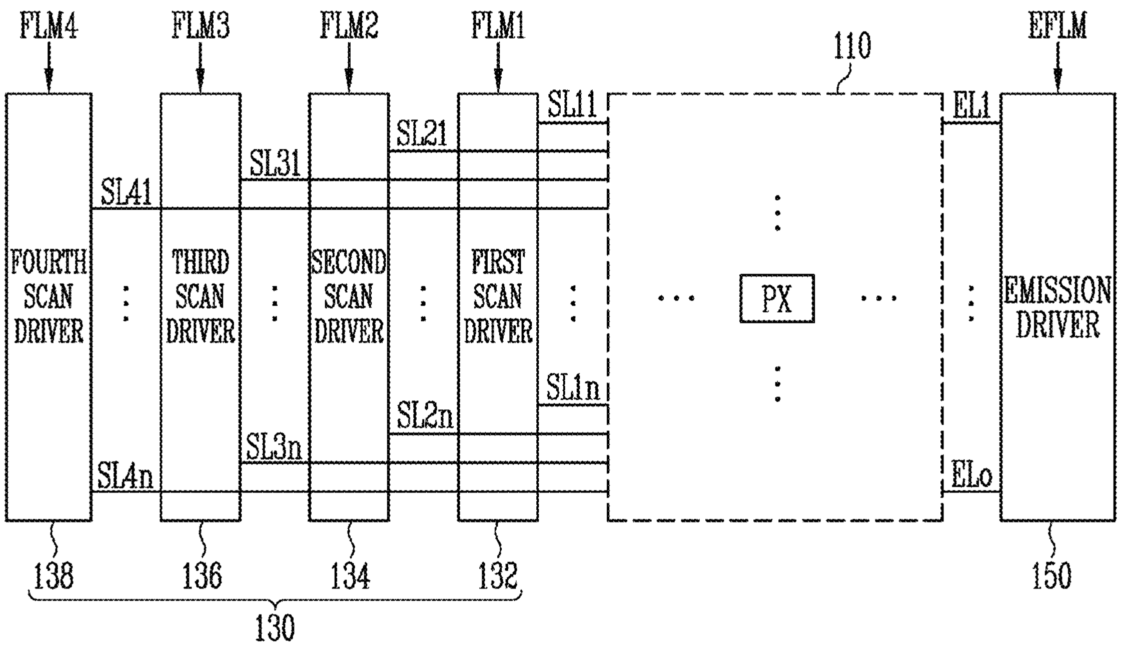
FIG. 2 is a diagram illustrating an embodiment of a scan driver and an emission driver, which are shown in FIG. 1.

FIG. 1 is a diagram illustrating an embodiment of a display device in accordance with the disclosure. FIG. 2 is a diagram illustrating an embodiment of a scan driver and an emission driver, which are shown in FIG. 1.

Referring to FIG. 1, the display device 100 in the embodiment of the disclosure may include a pixel unit 110 (or panel), a timing controller 120, a scan driver 130, a data driver 140, an emission driver 150, and a power supply 160.

The display device 100 may display an image at various image refresh rate (e.g., driving frequencies or screen refresh rates) according to driving conditions. The image refresh rate means a frequency at which a data signal is written to a driving transistor of a pixel PX. In an embodiment, the image refresh rate may also be also referred to as a screen scan rate or a screen refresh frequency, and represent a frequency at which a display screen is reproduced for one second, for example.

In an embodiment, an output frequency of the data driver 140 with respect to one horizontal line (e.g., pixels PX connected to the same scan line may be sorted as one horizontal line (or pixel row)) and/or an output frequency of a second scan driver 134 which outputs a second scan signal (or writing scan signal) may be determined corresponding to the image refresh rate. In an embodiment, an image refresh rate for driving a moving image may be a frequency of about 60 hertz (Hz) or higher (e.g., about 120 Hz, about 240 Hz, or the like), for example.

In an embodiment, the display device 100 may display an image, corresponding to various image refresh rates of about 1 Hz to about 240 Hz, for example. However, this is merely illustrative, and the display device 100 may also display an image at an image refresh rate of about 240 Hz or higher (e.g., about 480 Hz).

The pixel unit 110 may include pixels PX connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELo, and power lines PL1, PL2, PL3, PL4 and PL5(*n, m*, and *o* are natural numbers of 2 or more).

In an embodiment, a pixel PXij (refer to FIG. 3) disposed on an ith horizontal line (or pixel row) and a jth vertical line (or pixel column) may be connected to an ith first scan line SL1*i*, an ith second scan line SL2*i*, an ith third scan line SL3*i*, an ith fourth scan line SL4*i*, a kth emission control line ELk, and a jth data line DLj (i is an integer of n or less, j is an integer of m or less, and k is an integer of o or less). Here, k is a natural number which is equal to i or is smaller than i. In an embodiment, when each of the emission control lines EL1 to ELo is connected to pixels PX disposed on one horizontal line, k may be a natural number equal to i. In an embodiment, when each of the emission control lines EL1 to ELo is connected to pixels PX disposed on at least two horizontal lines, k may be a natural number smaller than i.

The pixels PX may be selected in units of horizontal lines when an enable first scan signal is supplied to the first scan lines SL11 to SL1*n*, and each of the pixels PX selected by the enable first scan signal may be supplied with a data signal from a data line (any one of DL1 to DLm) connected thereto. The pixel PX supplied with the data signal may generate light with a predetermined luminance, corresponding to a voltage of the data signal.

The scan driver 130 may receive a scan driving signal SCS from the timing controller 120. At least one scan start signal and clock signals, which are desired for driving of the scan driver 130, may be included in the scan driving signal SCS. The scan driver 130 may generate the enable first scan signal, an enable second scan signal, an enable third scan signal, and an enable fourth scan signal while shifting the scan start signal, corresponding to the clock signal.

To this end, the scan driver 130 may include a first scan driver 132, the second scan driver 134, a third scan driver 136, and a fourth scan driver 138 as shown in FIG. 2. At least some of the scan drivers 132, 134, 136, and 138 may be integrated into one driving circuit, one module, or the like according to a design.

The first scan driver 132 may receive a first scan start signal FLM1, and generate the enable first scan signal while shifting the first scan start signal FLM1, corresponding to the clock signal. The first scan driver 132 may sequentially supply the enable first scan signal to the first scan lines SL11 to SL1*n*. In an embodiment, the first scan driver 132 may supply the enable first scan signal during a writing period in an active area of one frame.

The second scan driver 134 may receive a second scan start signal FLM2, and generate the enable second scan signal while shifting the second scan start signal FLM2, corresponding to the clock signal. The second scan driver 134 may sequentially supply the enable second scan signal to the second scan lines SL21 to SL2*n*. In an embodiment, the second scan driver 134 may supply the enable second scan signal during the writing period in the active area of the one frame.

The third scan driver 136 may receive a third scan start signal FLM3, and generate the enable third scan signal while shifting the third scan start signal FLM3, corresponding to the clock signal. The third scan driver 136 may sequentially supply the enable third scan signal to the third scan lines SL31 to SL3*n*. In an embodiment, the third scan driver 136 may supply the enable third scan signal during the writing period in the active area of the one frame.

The fourth scan driver 138 may receive a fourth scan start signal FLM4, and generate the enable fourth scan signal while shifting the fourth scan start signal FLM4, corresponding to the clock signal. The fourth scan driver 138 may sequentially supply the enable fourth scan signal to the fourth scan lines SL41 to SL4*n*. In an embodiment, the fourth scan driver 138 may supply the enable fourth scan signal during the writing period in the active area of the one frame. In an embodiment, the fourth scan driver 138 may supply the enable fourth scan signal during a maintenance period included in the active area and a blank area of the one frame.

In an embodiment, the fourth scan driver 138 may perform scanning once during the writing period of the one frame (i.e., supply at least one enable fourth scan signal), and perform scanning at least once according to the image refresh rate during the maintenance period of the one frame, for example. When the image refresh rate is decreased (i.e., when a frame length is lengthened), the blank area of the one frame is lengthened, and hence a number of maintenance periods included in the blank area may be increased. That is, when the image refresh rate is decreased, a number of times an operation of supplying the enable fourth scan signal is repeated may be increased.

Figure 3:
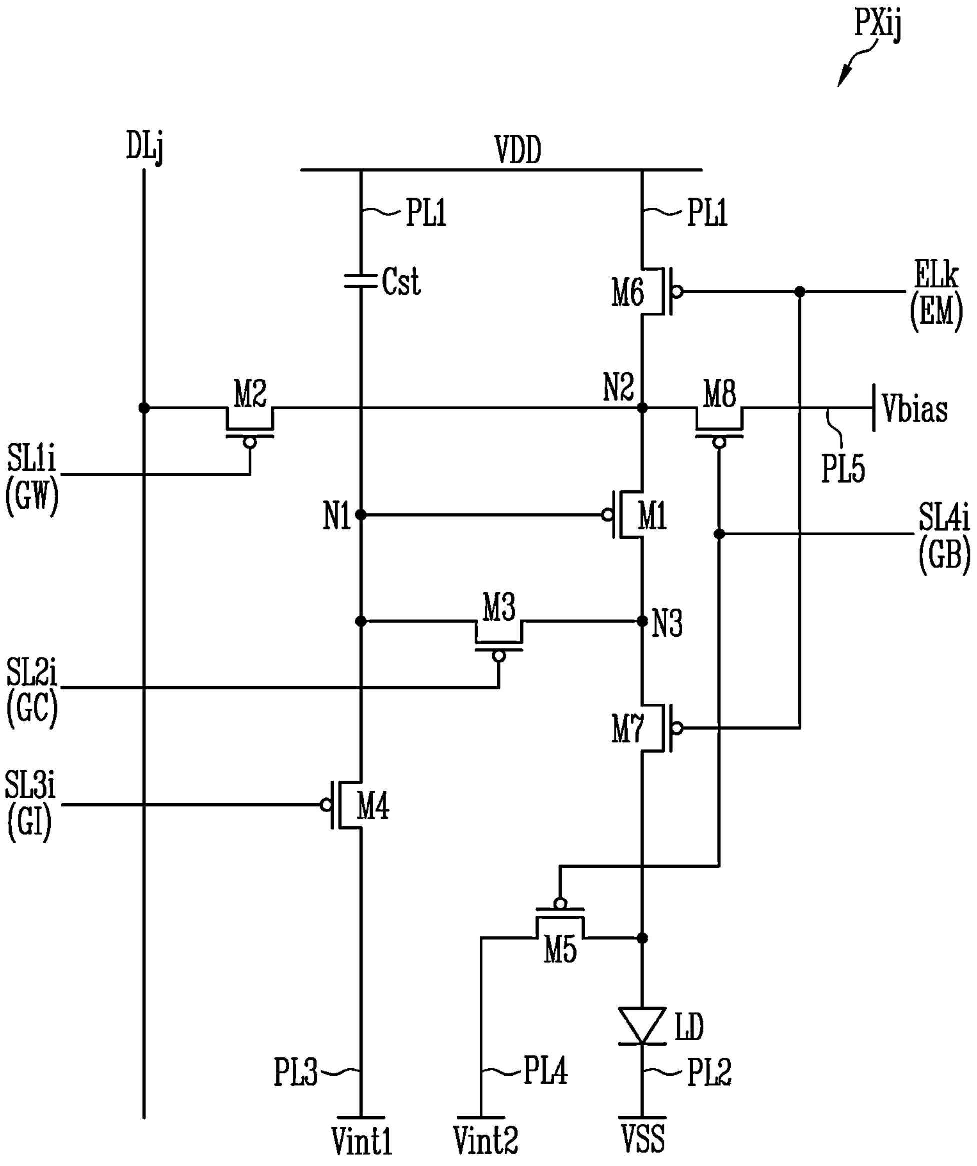
FIG. 3 is a diagram illustrating an embodiment of a pixel in accordance with the disclosure.

Each of the enable first scan signal, the enable second scan signal, the enable third scan signal, and the enable fourth scan signal may be set to a gate-on voltage such that transistors included in the pixels PX may be turned on. In an embodiment, each of an enable first scan signal GW, an enable second scan signal GC, an enable third scan signal GI, and an enable fourth scan signal GB, which are supplied to a P-type transistor as shown in FIG. 3, may be set to a relatively low level voltage.

In FIG. 2, it is illustrated that the first scan driver 132, the second scan driver 134, the third scan driver 136, and the fourth scan driver 138 are respectively connected to a first scan line SL1, a second scan line SL2, a third scan line SL3, and a fourth scan line SL4. However, the disclosure is not limited thereto. In an embodiment, at least two scan lines (at least two of SL1, SL2, SL3, and SL4) among the first scan line SL1, the second scan line SL2, the third scan line SL3, and the fourth scan line SL4 may be driven by one scan driver.

The data driver 140 may receive output data Dout and a data driving signal DCS from the timing controller 120. The data driving signal DCS may include a sampling signal and/or timing signals, desired for driving of the data driver 140. The data driver 140 may generate a data signal, based on the data driving signal DCS and the output data Dout. In an embodiment, the data driver 140 may generate an analog data signal, based on a grayscale of the output data Dout. The data driver 140 may supply the data signal in one horizontal period unit.

The emission driver 150 may receive an emission driving signal ECS from the timing controller 120. An emission start signal and clock signals, which are desired for driving the emission driver 150, may be included in the emission driving signal ECS. The emission driver 150 may generate a disable emission control signal (or relatively high level emission control signal) EM (refer to FIG. 3) while shifting the emission start signal, corresponding to the clock signal.

As shown in FIG. 2, the emission driver 150 may receive an emission start signal EFLM, and generate the disable emission control signal EM while shifting the emission start signal EFLM, corresponding to the clock signal. The emission driver 150 may sequentially supply the disable emission control signal EM to the emission control lines EL1 to ELo. The disable emission control signal EM may be set to a gate-off voltage such that the transistors included in the pixels PX may be turned off. In an embodiment, the disable emission control signal EM supplied to the P-type transistor as shown in FIG. 3 may be set to a relatively high level voltage.

In an embodiment, the emission driver 150 may supply the disable emission control signal EM during the writing period and the maintenance period of the one frame. In an embodiment, the emission driver 150 may perform scanning once during the writing period of the one frame, and perform scanning at least once according to the image refresh rate during the maintenance period of the one frame, for example. When the image refresh rate is decreased (i.e., when the frame length is lengthened), the blank area of the one frame is lengthened, and hence the number of maintenance periods included in the blank area may be increased. That is, when the image refresh rate is decreased, a number of times an operation of supplying the disable emission control signal EM is repeated may be increased.

The timing controller 120 may receive input data Din and a control signal CS from a host system through an interface. In an embodiment, the timing controller 120 may receive the input data Din and the control signal CS from at least one of a graphics processing unit ("GPU"), a central processing unit ("CPU"), and an application processor ("AP"), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively.

The timing controller 120 may realign the input data Din to be suitable for specifications of the display device 100. Also, the timing controller 120 may generate the output data Dout by correcting the input data Din, and supply the output data Dout to the data driver 140. In an embodiment, the timing controller 120 may correct the input data Din, corresponding to an optical measurement result measured in a processing process.

The power supply 160 may generate various power sources desired for driving of the display device 100. In an embodiment, the power supply 160 may generate a first driving power source VDD, a second driving power source VSS, a first initialization power source Vint1, a second initialization power source Vint2, and a bias power source Vbias.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX is set to be in an emission state.

The first initialization power source Vint1 may be a power source for initializing a gate electrode a driving transistor included in each of the pixels PX. The first initialization power source Vint1 may be set to a voltage lower than a voltage of the data signal. The second initialization power source Vint2 may be a power source for initializing a first electrode (or anode electrode) of a light-emitting element LD (refer to FIG. 3) included in each of the pixels PX. The second initialization power source Vint2 may be set to a voltage at which the light-emitting element LD is turned off. The bias power source Vbias may be a power source for applying an on-bias voltage to the driving transistor included in each of the pixels PX.

The first driving power source VDD generated by the power supply 160 may be supplied to a first power line PL1, the second driving power source VSS generated by the power supply 160 may be supplied to a second power line PL2, the first initialization power source Vint1 generated by the power supply 160 may be supplied to a third power line PL3, the second initialization power source Vint2 generated by the power supply 160 may be supplied to a fourth power line PL4, and the bias power source Vbias generated by the power supply 160 may be supplied to a fifth power line PL5. The first power line PL1, the second power line PL2, the third power line PL3, the fourth power line PL4, and the fifth power line PL5 may be commonly connected to the pixels PX, but the disclosure is not limited thereto.

In an embodiment, the first power line PL1 may be configured with a plurality of power lines, and the plurality of power lines may be connected to different pixels PX. In an embodiment, the second power line PL2 may be configured with a plurality of power lines, and the plurality of power lines may be connected to different pixels PX. In an embodiment, the third power line PL3 may be configured with a plurality of power lines, and the plurality of power lines may be connected to different pixels PX. In an embodiment, the fourth power line PL4 may be configured with a plurality of power lines, and the plurality of power lines may be connected to different pixels PX. In an embodiment, the fifth power line PL5 may be configured with a plurality of power lines, and the plurality of power lines may be connected to different pixels PX. That is, in an embodiment of the disclosure, the pixels PX may be connected to any one of the plurality of power lines of the first power line PL1, any one of the plurality of power lines of the second power line PL2, any one of the plurality of power lines of the third power line PL3, any one of the plurality of power lines of the fourth power line PL4, and any one of the plurality of power lines of the fifth power line PL5.

In an embodiment of the disclosure, the display device 100 may include a flat display device, a curved display device in which a portion of the pixel unit 110 is curved, a flexible display device in which a portion of the pixel unit 110 is folded or bent, and a stretchable display device in which a portion of the pixel unit 110 is expanded/contracted.

In an embodiment of the disclosure, the display device is a device which displays moving images or still images, and may include portable electronic devices such as a mobile phone, a smartphone, a tablet personal computer ("PC"), a smart watch, a watch phone, a portable multimedia player ("PMP"), a navigation system, and an ultra mobile computer ("UMPC"). In an embodiment of the disclosure, the display device 100 may include electronic devices such as a television, a notebook computer, a monitor, an advertisement board, and Internet of things ("IoT").

FIG. 3 is a diagram illustrating an embodiment of a pixel in accordance with the disclosure. In FIG. 3, a pixel PXij disposed on an ith horizontal line and a jth vertical line will be illustrated.

Referring to FIG. 3, the pixel PXij in the embodiment of the disclosure may be connected to corresponding signal lines SL1*i*, SL2*i*, SL3*i*, SL4*i*, ELk, and DLj. In an embodiment, the pixel PXij may be connected to an ith first scan line SL1*i*, an ith second scan line SL2*i*, an ith third scan line SL3*i*, an ith fourth scan line SL4*i*, a kth emission control line ELk, and a jth data line DLj, for example. In an embodiment, the pixel PXij may be further connected to the first power line PL1, the second power line PL2, the third power line PL3, the fourth power line PL4, and the fifth power line PL5.

The pixel PXij in the embodiment of the disclosure may include a light-emitting element LD and a pixel circuit for controlling an amount of current supplied to the light-emitting element LD.

The light-emitting element LD may be connected between the first power line PL1 and the second power line PL2. In an embodiment, a first electrode (or anode electrode) of the light-emitting element LD may be electrically connected to the first power line PL1 via a seventh transistor M7, a third node N3, a first transistor M1, a second node N2, and a sixth transistor M6, and a second electrode (or cathode electrode) of the light-emitting element LD may be electrically connected to the second power line PL2. The light-emitting element LD may generate light with a predetermined luminance, corresponding to an amount of current supplied from the first power line PL1 to the second power line PL2 via the pixel circuit.

The light-emitting element LD may be selected as an organic light-emitting diode ("OLED"). Also, the light-emitting element LD may be selected as an inorganic light-emitting diode ("LED") such as a micro LED or a quantum dot LED. Also, the light-emitting element LD may be an element configured with a combination of an organic material and an inorganic material. In FIG. 3, it is illustrated that the pixel PXij includes a single light-emitting element LD. However, in another embodiment, the pixel PXij may include a plurality of light-emitting elements LD, and the plurality of light-emitting elements LD may be connected in series, parallel or series/parallel to each other.

The pixel circuit may include the first transistor M1, a second transistor M2, a third transistor M3, a fourth transistor M4, a fifth transistor M5, the sixth transistor M6, the seventh transistor M7, an eighth transistor M8, and a storage capacitor Cst.

A first electrode of the first transistor M1 (or driving transistor) may be connected to the second node N2, and a second electrode of the first transistor M1 may be connected to the third node N3. In addition, a gate electrode of the first transistor M1 may be connected to a first node N1. The first transistor M1 may control an amount of current supplied from the first driving power source VDD to the second driving power source VSS via the light-emitting element LD, corresponding to a voltage of the first node N1.

The second transistor M2 may be connected between the j-th data line DLj and the second node N2. In addition, a gate electrode of the second transistor M2 may be electrically connected to the first scan line SL1*i*. The second transistor M2 may be turned on when an enable first scan signal GW is supplied to the second scan line SL2*i*, to electrically connect the j-th data line DLj and the second node N2 to each other.

The third transistor M3 may be connected between the first node N1 and the third node N3. In addition, a gate electrode of the third transistor M3 may be electrically connected to the second scan line SL2*i*. The third transistor M3 may be turned on when an enable second scan signal GC is supplied to the second scan line SL2*i*, to electrically connect the first node N1 and the third node N3 to each other. That is, when the third transistor M3 is turned on, the first transistor M1 may be connected in a diode form.

A first electrode of the fourth transistor M4 may be connected to the first node N1, and a second electrode of the fourth transistor M4 may be electrically connected to the third power line PL3. In addition, a gate electrode of the fourth transistor M4 may be electrically connected to the third scan line SL3*i*. The fourth transistor M4 may be turned on when an enable third scan signal GI is supplied to the third scan line SL3*i*, to supply the voltage of the first initialization power source Vint1 to the first node N1.

A first electrode of the fifth transistor M5 may be electrically connected to the first electrode of the light-emitting element LD, and a second electrode of the fifth transistor M5 may be electrically connected to the fourth power line PL4. In addition, a gate electrode of the fifth transistor M5 may be electrically connected to the fourth scan line SL4*i*. The fifth transistor M5 may be turned off when an enable fourth scan signal GB is supplied to the fourth scan line SL4*i*, to supply the voltage of the second initialization power source Vint2 to the first electrode of the light-emitting element LD.

When the voltage of the second initialization power source Vint2 is supplied to the first electrode of the light-emitting element LD, a parasitic capacitor of the light-emitting element LD may be discharged. As a residual voltage charged in the parasitic capacitor of the light-emitting element LD is discharged (or removed), unintended minute emission may be prevented. Thus, the black expression ability of the pixel PXij may be improved.

A first electrode of the sixth transistor M6 may be electrically connected to the first power line PL1, and a second electrode of the sixth transistor M6 may be connected to the second node N2. In addition, a gate electrode of the sixth transistor M6 may be electrically connected to the kth emission control line ELk. The sixth transistor M6 may be turned off when a disable emission control signal EM is supplied to the kth emission control line ELk, and be turned on when an enable emission control signal EM is supplied to the kth emission control line ELk.

The seventh transistor M7 may be connected between the third node N3 and the first electrode of the light-emitting element LD. In addition, a gate electrode of the seventh transistor M7 may be electrically connected to the kth emission control line ELk. The seventh transistor M7 may be turned off when the disable emission control signal EM is supplied to the kth emission control line ELk, and be turned on when the enable emission control signal EM is supplied to the kth emission control line ELk.

A first electrode of the eighth transistor M8 (or bias transistor) may be electrically connected to the fifth power line PL5, and a second electrode of the eighth transistor M8 may be connected to the second node N2. In addition, a gate electrode of the eighth transistor M8 may be electrically connected to the fourth scan line SL4*i*. The eighth transistor M8 may be turned on when the enable fourth scan signal GB is supplied to the fourth scan line SL4*i*, to electrically connect the fifth power line PL5 and the second node N2 to each other.

The storage capacitor Cst may be connected between the first power line PL1 and the first node N1. The storage capacitor Cst may store a voltage applied to the first node N1.

In FIG. 3, it is illustrated that the first to eighth transistors M1 to M8 are implemented with a P-type transistor. However, the disclosure is not limited thereto. Some transistors (e.g., M3 and M4) among the first to eighth transistors M1 to M8 may be implemented with an N-type transistor.

Figure 4:
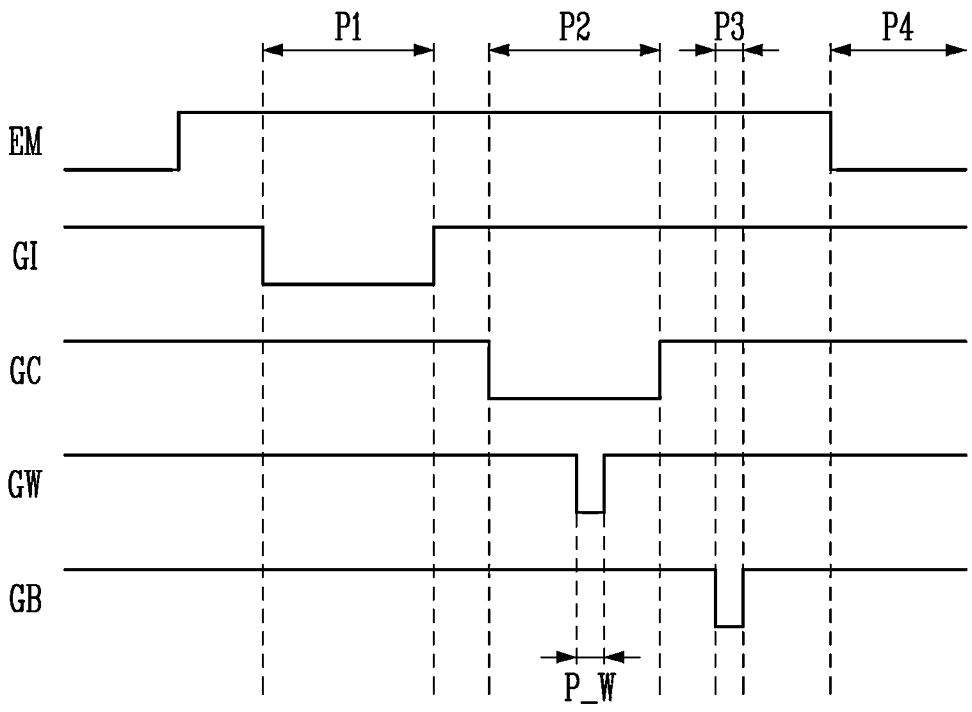
FIG. 4 is a waveform diagram illustrating an embodiment of a method of driving the pixel shown in FIG. 3 during a writing period.

FIG. 4 is a waveform diagram illustrating an embodiment of a method of driving the pixel shown in FIG. 3 during a writing period. The writing period WP may be included in an active area of a frame.

Referring to FIGS. 3 and 4, the writing period WP may include a first period P1, a second period P2, a third period P3, and a fourth period P4. The first period P1 to the third period P3 may be set as a non-emission period, and the fourth period P4 may be set as an emission period.

During the first period P1 to the third period P3, the disable emission control signal EM may be supplied to the kth emission control line ELk. When the disable emission control signal EM is supplied to the kth emission control line ELk, the sixth transistor M6 and the seventh transistor M7 may be turned off. When the sixth transistor M6 and the seventh transistor M7 are turned off, electric connection between the first power line PL1 and the light-emitting element LD may be blocked, and accordingly, the light-emitting element LD may be set to be in a non-emission state.

During the first period P1, the enable third scan signal GI may be supplied to the third scan line SL3*i*. When the enable third scan signal GI is supplied to the third scan line SL3*i*, the fourth transistor M4 may be turned on. When the fourth transistor M4 is turned on, the voltage of the first initialization power source Vint1 of the third power line PL3 may be supplied to the first node N1. When the voltage of the first initialization power source Vint1 is supplied to the first node N1, may be set to be in a strong on-bias state.

During the second period P2, the enable second scan signal GC may be supplied to the second scan line SL2*i*, and accordingly, the third transistor M3 may be turned on. When the third transistor M3 is turned on, the first transistor M1 may be diode-connected.

In a writing area P_W overlapping with the second period P2, the enable first scan signal GW may be supplied to the first scan line SL1*i*. When the enable first scan signal GW is supplied to the first scan line SL1*i*, the second transistor M2 may be turned on. When the second transistor M2 is turned on, a data signal from the j-th data line DLj may be supplied to the second node N2. Since the form in which the first transistor M1 is diode-connected is maintained by the turned-on third transistor M3, the first node N1 may have a voltage obtained by compensating for a threshold voltage of the first transistor M1 in the data signal.

During the third period P3, the enable fourth scan signal GB may be supplied to the fourth scan line SL4*i*. When the enable fourth scan signal GB is supplied to the fourth scan line SL4*i*, the fifth transistor M5 and the eighth transistor M8 may be turned on. When the fifth transistor M5 is turned on, the voltage of the second initialization power source Vint2 may be supplied to the first electrode of the light-emitting element LD, and accordingly, the light-emitting element LD may be initialized. When the eighth transistor M8 is turned on, a voltage of the bias power source Vbias may be supplied to the second node N2. When the voltage of the bias power source Vbias is supplied to the second node N2, the first transistor M1 may be set to be in an on-bias state.

In the fourth period P4, the enable emission control signal (or relatively low level emission control signal) EM may be supplied to the kth emission control line ELk, so that the sixth transistor M6 and the seventh transistor M7 are turned on. When the sixth transistor M6 and the seventh transistor M7 are turned on, a current flowing path may be formed from the first power line PL1 to the second power line PL2 via the sixth transistor M6, the first transistor M1, the seventh transistor M7, and the light-emitting element LD. A driving current corresponding to the voltage of the first node N1 may flow through the light-emitting element LD according to an operation of the first transistor M1, and the light-emitting element LD may emit light with a luminance corresponding to the driving current.

Figure 5:
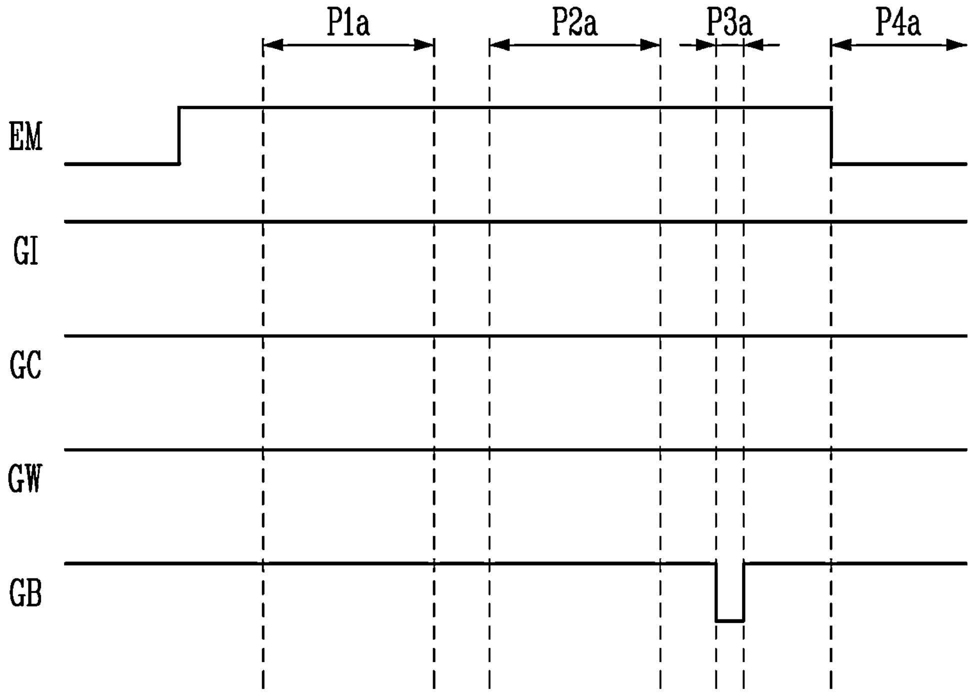
FIG. 5 is a waveform diagram illustrating an embodiment of the method of driving the pixel shown in FIG. 3 during a maintenance period.

FIG. 5 is a waveform diagram illustrating an embodiment of the method of driving the pixel shown in FIG. 3 during a maintenance period. The maintenance period MP is a period in which light is emitted while maintaining the voltage of a data signal supplied previously, and may be a period in which an image is displayed without changing any frame. In an embodiment, one frame may include one writing period WP in an active area thereof and a plurality of maintenance periods MP in the active area and a blank area thereof. The plurality of maintenance periods MP may be successively disposed after the writing period WP.

As compared with the writing period WP, in the maintenance period MP, a threshold voltage compensation operation and a data writing operation may be omitted, and an operation of applying a bias voltage to the first transistor M1 and an operation of initializing the light-emitting element LD may be performed. The maintenance period MP may be set to have a length similar to a length of the writing period WP. The maintenance period MP may include a first period P1*a*, a second period P2*a*, a third period P3*a*, and a fourth period P4*a*.

Referring to FIGS. 3 and 5, in the first period P1*a* to the third period P3*a*, the disable emission control signal EM may be supplied to the kth emission control line ELk. When the disable emission control signal EM is supplied to the kth emission control line ELk, the sixth transistor M6 and the seventh transistor M7 may be turned off, and accordingly, the light-emitting element LD may be set to be in the non-emission state.

In the first period P1*a* to the third period P3*a*, the enable first scan signal GW, the enable second scan signal GC, and the enable third scan signal GI may not be supplied (or disable scan signals GW, GC, and GI may be supplied). Accordingly, in the first period P1*a* to the third period P3*a*, the second transistor M2, the third transistor M3, and the fourth transistor M4 may be set to be in a turn-off state.

In the third period P3*a*, the enable fourth scan signal GB may be supplied to the fourth scan line SL4*i*. When the enable fourth scan signal GB is supplied to the fourth scan line SL4*i*, the fifth transistor M5 and the eighth transistor M8 may be turned on.

When the fifth transistor M5 is turned on, the voltage of the second initialization power source Vint2 may be supplied to the first electrode of the light-emitting element LD, and accordingly, the light-emitting element LD may be initialized. When the eighth transistor M8 is turned on, the voltage of the bias power source Vbias may be supplied to the second node N2. When the voltage of the bias power source Vbias is supplied to the second node N2, the first transistor M1 may be set to be in the on-bias state.

Since the one frame includes the writing period WP and the maintenance period MP, the above-described display device 100 in the embodiment of the disclosure may be driven at various driving frequencies (various frame frequencies).

Figure 6:
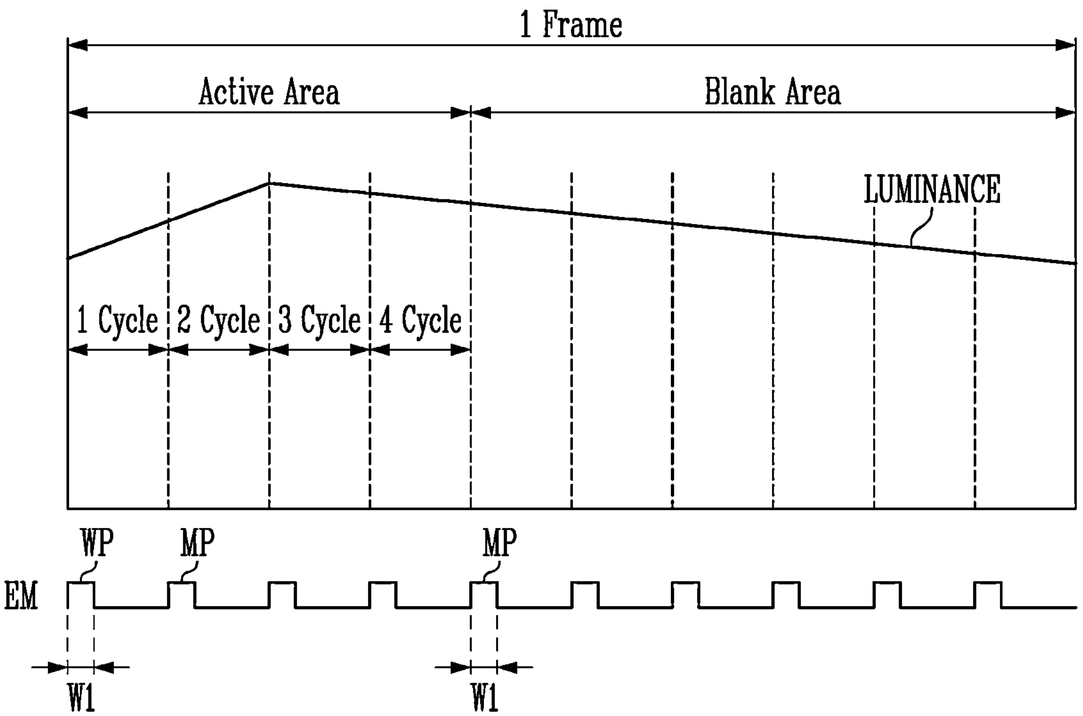
FIG. 6 is a diagram illustrating a luminance of one frame period.

FIG. 6 is a diagram illustrating a luminance of one frame period. In FIG. 6, a luminance of pixels disposed on one horizontal line will be illustrated. In FIG. 6, a portion indicated by Cycle may mean a period in which light the pixels emit and do not emit light in response to one emission control signal EM. In FIG. 6, it is assumed that the display device 100 is driven at about 48 Hz, and ten disable emission control signals EM are supplied during one frame period.

In an embodiment, four disable emission control signals (also referred to as first to fourth active area emission control signals, respectively) EM may be supplied in an active area Active Area. In an embodiment, the active area Active Area may include one writing period WP and three maintenance periods MP. The active area Active Area may be set to have the same length regardless of the image refresh rate, and accordingly, the number (e.g., 4) of disable emission control signals EM supplied in the active area Active Area may be set constant regardless of the image refresh rate.

In an embodiment, six disable emission control signals EM may be supplied in a blank are Blank Area. In an embodiment, the blank are Blank Area may include six maintenance periods MP. The length of the blank area Blank Area may be differently set corresponding to the image refresh rate, and accordingly, the number of disable emission control signals EM supplied in the blank area Blank Area may be differently set corresponding to the image refresh rate.

Referring to FIG. 6, during the one frame period, the luminance of a predetermined horizontal line may be increased during a predetermined period and then be continuously decreased. In an embodiment, the luminance of the predetermined horizontal line may be increased during periods 1 Cycle and 2 Cycle of the active area Active Area, and be gradually decreased after a start point of a period 3 Cycle.

In an embodiment, the first transistor M1 may be set to be in the strong on-bias state during the first period P1 of the writing period WP as described in FIG. 4. A characteristic curve of the first transistor M1 may be changed (e.g., negative shift), and the luminance of the predetermined horizontal line may be gradually increased while the characteristic curve of the first transistor M1 returns to the original place during a predetermined period (e.g., the periods 1 Cycle and 2 Cycle) (e.g., the luminance of the predetermined horizontal lien may be gradually increased during the periods 1 Cycle and 2 Cycle). In addition, after the period 3 Cycle, the luminance of the predetermined horizontal line may be gradually decreased by a leakage current of the third transistor M3 and the fourth transistor M4.

When a luminance difference is set relatively large on the predetermined horizontal line during the one frame period, this may be recognized as a flicker by a user. In an embodiment of the disclosure, the width of disable emission control signals EM supplied in the active area Active Area may be controlled so as to minimize the luminance difference on the predetermined horizontal line.

Figure 7A:
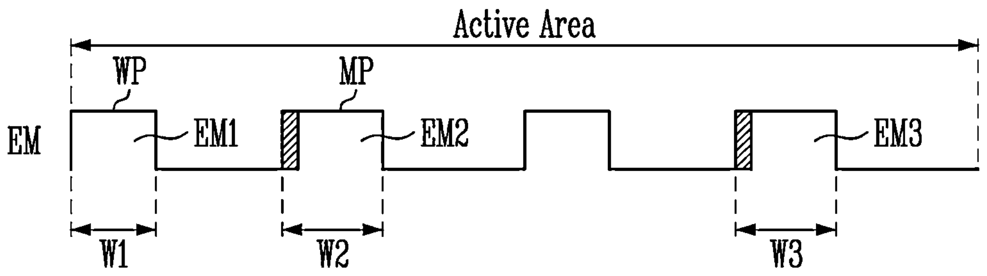
FIGS. 7A and 7B are diagram illustrating an embodiment of emission control signals supplied during an active area.
Figure 7B:
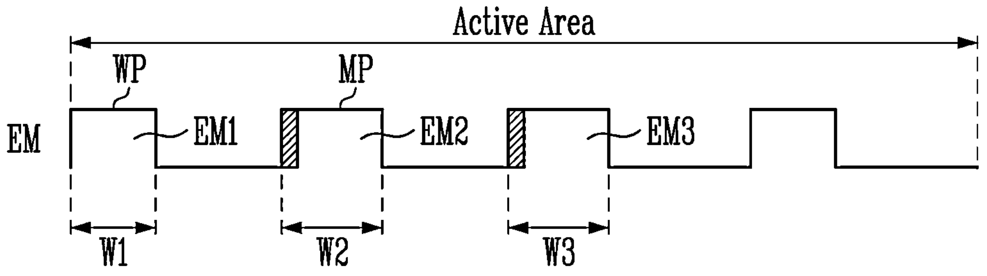

FIGS. 7A and 7B are diagram illustrating an embodiment of emission control signals supplied during the active area.

Referring to FIGS. 6 and 7A, the luminance of a predetermined horizontal line may be set highest the period 3 Cycle during the one frame period. Thus, when the luminance of the period 3 Cycle is decreased, the luminance difference of the predetermined horizontal line may be minimized, and accordingly, display quality may be improved.

Additionally, when the luminance is increased at an initial stage of the active area Active Area, a luminance difference from a blank area Blank Area of a previous frame may occur. Thus, when the luminance of the period 2 Cycle is decreased, the luminance difference between the previous frame and the current frame is minimized, and accordingly, the display quality may be improved.

To this end, in an embodiment of the disclosure, at least two disable emission control signals EM having different widths may be supplied in the active area Active Area.

In an embodiment, a disable emission control signal EM supplied in a writing period WP of the active area Active Area may be set to have a first width W1. The disable emission control signal EM having the first width W1 may be also referred to as a first emission control signal EM1. A disable emission control signal having the first width W1 may also be supplied in a maintenance period MP of the blank area Blank Area.

In an embodiment, at least one disable emission control signal which is included in the active area Active Area and is supplied in the maintenance period MP after the writing period WP may have a width different from the first width W1. In an embodiment, a second disable emission control signal EM supplied in the active area Active Area (or supplied in a first maintenance period MP) may be set to have a second width W2. The disable emission control signal EM having the second width W2 may be also referred to as a second emission control signal EM2. In an embodiment, a fourth disable emission control signal EM supplied in the active area Active Area may be set to have a third width W3. The disable emission control signal EM having the third width W3 may be also referred to as a third emission control signal EM3.

Each of the second width W2 and the third width W3 may be set as a relatively wide (or long) width as compared with the first width W1. Also, the second width W2 and the third width W3 may be equal to or different from each other. In FIG. 7A, a portion hatched by black in the disable emission control signal EM may mean a widened width (or period) as compared with the disable emission control signal EM having the first width W1.

In an embodiment, when the second disable emission control signal EM supplied in the active area Active Area is set to have the second width W2, an initial luminance of the active area Active Area is decreased, and accordingly, the luminance difference from the blank area Blank Area of the previous frame may be minimized.

In an embodiment, when the fourth disable emission control signal EM supplied in the active area Active Area is set to have the third width W3, the luminance of the period 3 Cycle is decreased, and accordingly, a luminance difference in the one frame may be minimized.

In FIG. 7A, it has been described that the width of the second disable emission control signal EM and the fourth disable emission control signal EM, which are supplied in the active area Active Area, are widened. However, the disclosure is not limited thereto.

In an embodiment, the widths of the second disable emission control signal EM and a third disable emission control signal EM, which are supplied in the active area Active Area, may be set relatively wide as shown in FIG. 7B. When the width of the third disable emission control signal EM is set as the third width W3, the luminance of the period 2 Cycle and/or the period 3 Cycle is decreased, and accordingly, the luminance difference in the one frame may be minimized.

Figure 8:
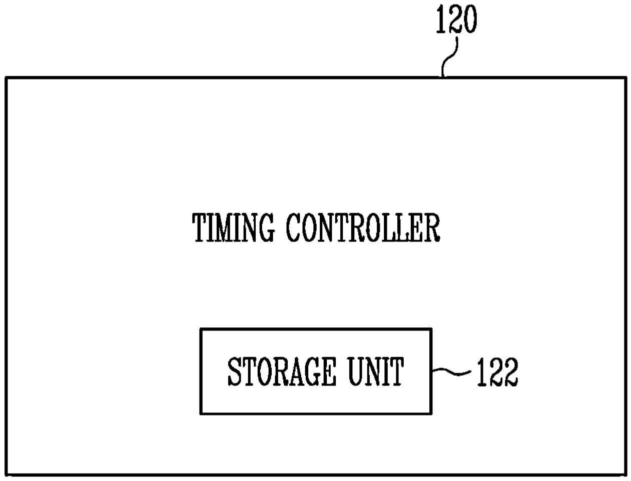
FIG. 8 is a diagram illustrating an embodiment of a timing controller shown in FIG. 1.

FIG. 8 is a diagram illustrating an embodiment of the timing controller shown in FIG. 1. In FIG. 8, only components desired for description of the disclosure will be illustrated.

Referring to FIG. 8, the timing controller 120 may include a storage unit (e.g., memory) 122. Information of the first width W1, the second width W2, and the third width W3, which are shown in FIGS. 6 to 7B, may be stored in the storage unit 122. The first width W1, the second width W2, and the third width W3, which are stored in the storage unit 122, may correspond to the width (length, time) of the disable emission control signal.

In an embodiment, when the disable emission control signal EM is supplied as shown in FIG. 7A, the timing controller 120 may supply an emission start signal EFLM having the first width W1 during the writing period WP (or corresponding to the first emission control signal of the frame). Then, the emission driver 150 may supply a disable emission control signal EM having the first width W1 to the emission control lines EL1 to ELo.

The timing controller 120 may supply an emission start signal EFLM having the second width W2, corresponding to the second disable emission control signal EM. Then, the emission driver 150 may supply a disable emission control signal EM having the second width W2 to the emission control lines EL1 to ELo.

The timing controller 120 may supply an emission start signal EFLM having the third width W3, corresponding to the fourth disable emission control signal EM. Then, the emission driver 150 may supply a disable emission control signal EM having the third width W3 to the emission control lines EL1 to ELo.

The timing controller 120 may supply the emission start signal EFLM, corresponding to the third disable emission control signal EM and the other disable emission control signals EM supplied in the blank area Blank Area. Then, the emission driver 150 may supply the disable emission control signal EM having the first width W1 to the emission control lines EL1 to ELo.

Figure 9:
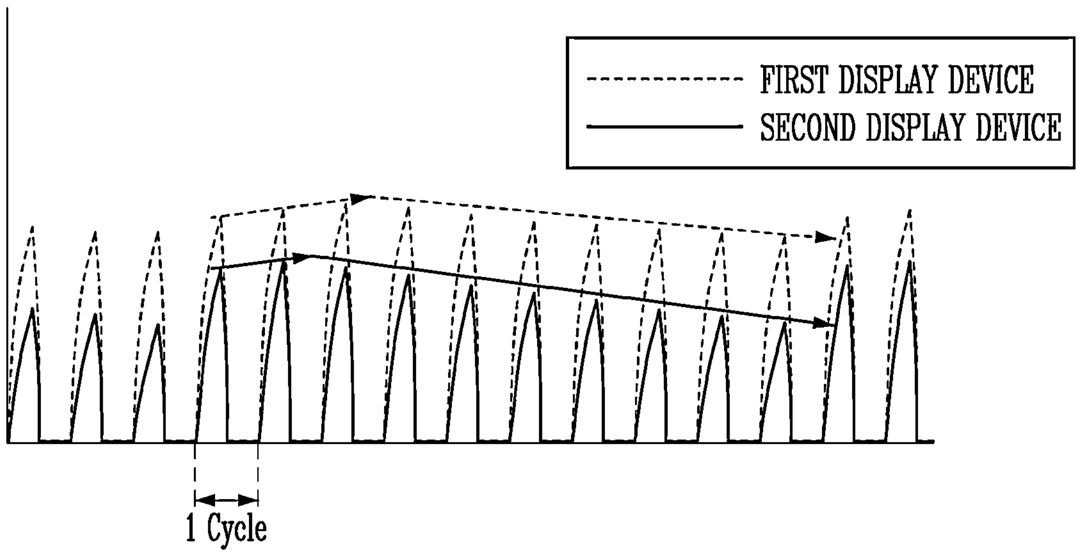
FIG. 9 is a diagram illustrating a luminance of one frame period of display devices.

FIG. 9 is a diagram illustrating a luminance of one frame period of display devices. In FIG. 9, different display devices are driven at about 48 Hz, and ten disable emission control signals EM are supplied during one frame period.

Referring to FIG. 9, although the same data signal is supplied to the display devices, the display devices may have different luminances during the one frame period. When the display devices have different luminances, the second width W2 and the third width W3, which are shown in FIGS. 7A and 7B, may be set to be different with respect to the display devices.

In an embodiment, the second width W2 and the third width W3 are set to be the same for each display device, a characteristic of the display device cannot be reflected. Therefore, in an embodiment of the disclosure, the second width W2 and the third width W3 may be set by reflecting the characteristic of the display device.

Figure 10:
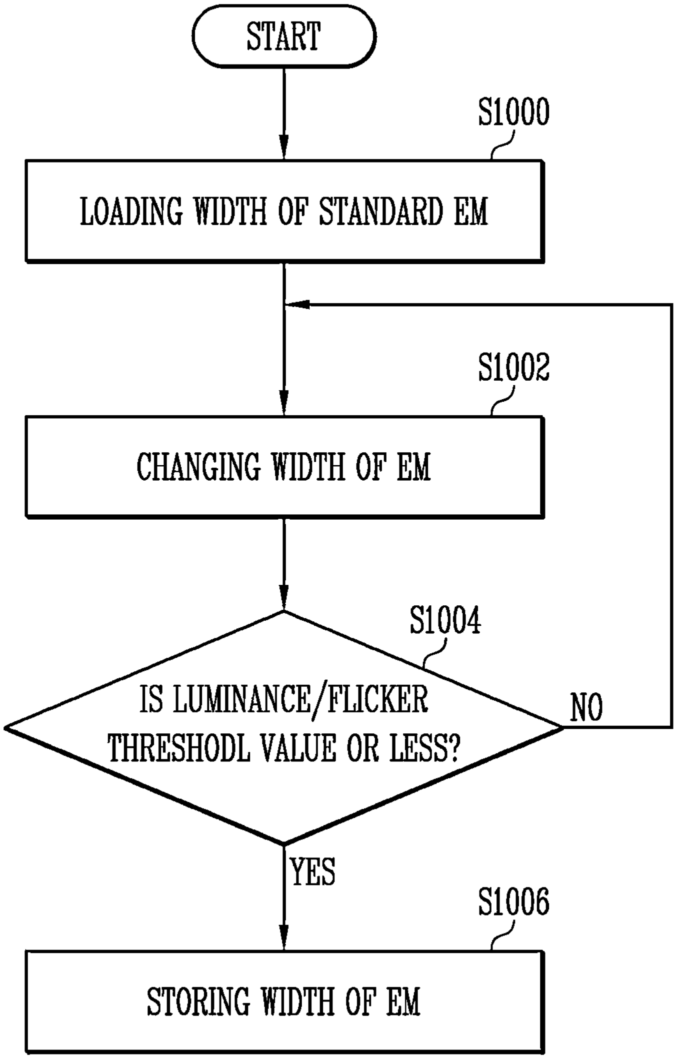
FIG. 10 is a diagram illustrating an embodiment of an embodiment of a method of setting a width of an emission control signal in accordance with the disclosure.

FIG. 10 is a diagram illustrating an embodiment of an embodiment of a method of setting a width of an emission control signal in accordance with the disclosure. The setting of the width of the emission control signal, which is shown in FIG. 10, may be set for each display device 100 through multi-time programming ("MTP"). The width of the emission control signal may be set in a processing process.

Referring to FIG. 10, first, a width of a standard disable emission control signal EM may be loaded (S1000). In an embodiment, the width of the standard disable emission control signal EM may be set as a first width W1. In the operation S1000, the width of the standard disable emission control signal EM may be loaded by the timing controller 120. The width of the standard disable emission control signal EM may be pre-stored in the storage unit 122. In the operation S1000, the width of the standard disable emission control signal EM may be disposed by a separate processing device electrically connected to the timing controller 120 in the processing process.

After the width of the standard disable emission control signal EM is loaded in the operation S1000, a width of at least one disable emission control signal among a second emission control signal EM to a fourth disable emission control signal EM, which are supplied in an active area Active Area may be changed (S1002).

In an embodiment, in the operation S1002, the width of each of the second disable emission control signal EM (or EM2) and the fourth disable emission control signal EM (or EM3) may be changed as shown in FIG. 7A. In an embodiment, in the operation S1002, the width of each of the second disable emission control signal EM (or EM2) and the third disable emission control signal EM (or EM3) may be changed as shown in FIG. 7B.

After the width of the disable emission control signal EM is changed in the operation S1002, it may be determined whether each of a luminance and a flicker is a threshold value or less while measuring the pixel unit 110 (S1004). In the operation S1004, the luminance may mean a luminance difference between frames, which corresponds to a change in image refresh rate. In the operation S1004, the flicker may mean a luminance difference in one frame.

When each of the luminance and the flicker is set to the threshold value or less in the operation S1004, the width of a corresponding disable emission control signal EM may be stored in the storage unit 122 (S1006). When each of the luminance and the flicker exceeds the threshold value in the operation S1004, the operations S1000 to S1004 may be repeated.

Figure 11:
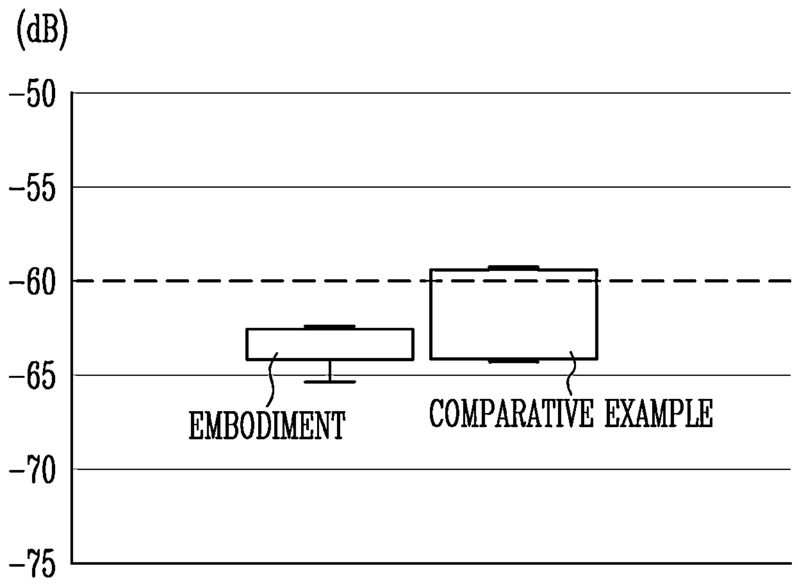
FIG. 11 is a diagram illustrating flicker characteristics of an embodiment of the disclosure and a comparative example.

FIG. 11 is a diagram illustrating flicker characteristics of an embodiment of the disclosure and a comparative example. In FIG. 11, a flicker may mean a luminance difference corresponding to a lapse of time in one frame. In FIG. 11, a flicker characteristic obtained by inspecting ten display devices is illustrated. In FIG. 11, a value (or threshold value) satisfying the flicker characteristic may be −60 decibels (dB) or less. In FIG. 11, "EMBODIMENT" may mean a case where the width of each of the second disable emission control signal EM and the fourth disable emission control signal EM, which are supplied in the active area Active Area, is set to be different with respect to the display devices. In FIG. 11, "COMPARATIVE EXAMPLE" may mean a case where widths of disable emission control signals EM supplied in the active area Active Area are all set to be the same.

Referring to FIG. 11, in the case of the disclosure, the flicker characteristic of the display devices may be set to the threshold value or less. That is, in the display devices in the embodiment of the disclosure, a luminance difference in one frame period may be minimized, and accordingly, display quality may be improved.

A flicker characteristic of some of the display devices of the comparative example may exceed the threshold value. When the flicker characteristic exceeds the threshold value, a luminance difference in one frame period may be recognized by a user. When the flicker characteristic exceeds the threshold value, the display devices may be determined as defective products, and therefore, manufacturing cost may be increased.

Figure 12:
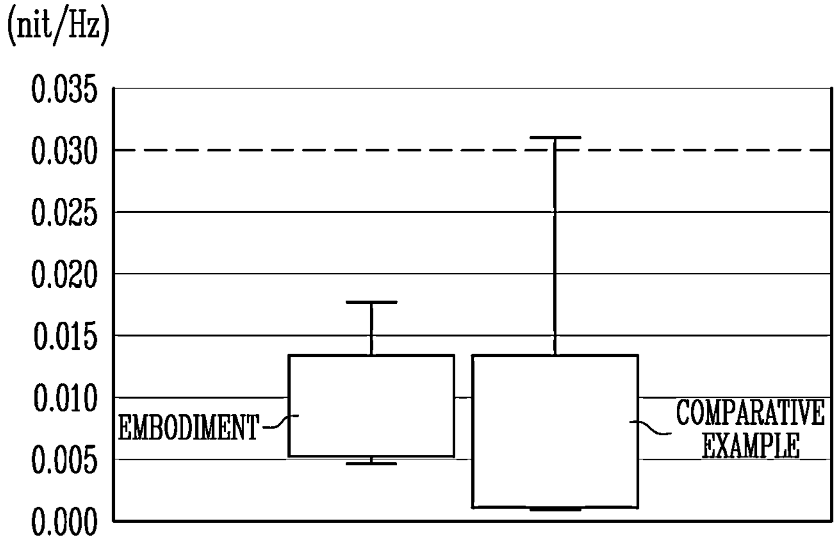
FIG. 12 is a diagram illustrating luminance difference characteristics of an embodiment of the disclosure and a comparative example.

FIG. 12 is a diagram illustrating luminance difference characteristics of an embodiment of the disclosure and a comparative example. In FIG. 11, a luminance difference may mean a luminance difference between frames, which corresponds to a change in image refresh. In FIG. 12, a luminance difference characteristic obtained by inspecting ten display devices is illustrated. In FIG. 12, a value (or threshold value) satisfying the luminance difference characteristic may be about 0.030 nit per hertz (nit/Hz) or less. In FIG. 12, "EMBODIMENT" may mean a case where the width of each of the second disable emission control signal EM and the fourth disable emission control signal EM, which are supplied in the active area Active Area, is set to be different with respect to the display devices. In FIG. 12, "COMPARATIVE EXAMPLE" may mean a case where widths of disable emission control signals EM supplied in the active area Active Area are all set to be the same.

Referring to FIG. 12, in the case of the disclosure, the luminance difference characteristic of the display devices may be set to the threshold value or less. That is, the display devices in the embodiment of the disclosure may generate similar luminances in each frame regardless of the change in image refresh rate, and accordingly, display quality may be improved.

A luminance difference characteristic of some of the display devices of the comparative example may exceed the threshold value. When the luminance difference characteristic exceeds the threshold value, a luminance difference corresponding to the change in image refresh rate may be recognized by a user. When the luminance difference characteristic exceeds the threshold value, the display devices may be determined as defective products, and therefore, manufacturing cost may be increased.

Figure 13:
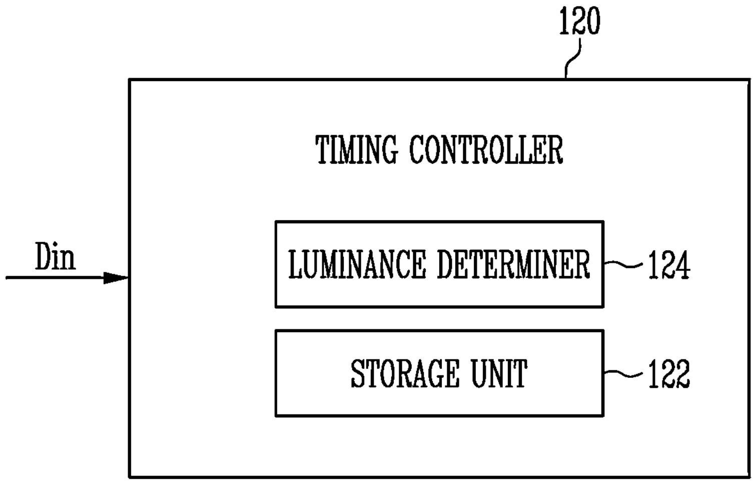
FIG. 13 is a diagram illustrating an embodiment of the timing controller shown in FIG. 1.

FIG. 13 is a diagram illustrating an embodiment of the timing controller shown in FIG. 1. FIGS. 14A to 16B are diagrams illustrating an embodiment of disable emission control signals corresponding to a control of the timing controller.

In FIG. 13, only components desired for description of the disclosure will be illustrated. In FIG. 13, components overlapping with those shown in FIG. 8 will be briefly described.

Referring to FIG. 13, the timing controller 120 may include a storage unit 122 and a luminance determiner 124.

Information of the first width W1, the second width W2, and the third width W3, which are shown in FIGS. 7A, 7B, 14A, and 14B, may be stored in the storage unit 122. In addition, information of second widths W2*a*, W2*b*, and W2*c* and third widths W3*a* and W3*b*, which are shown in FIGS. 15A to 17B, may be stored in the storage unit 122.

The luminance determiner 124 may determine a luminance in a frame unit, using input data Din. In an embodiment, the luminance determiner 124 may calculate an on-pixel ratio ("OPR") of the input data Din, and determine the luminance in the frame unit, based on the OPR. The OPR may be a ratio of pixels activated based on the input data Din with respect to the number of pixels PX included in the pixel unit 110. In an embodiment, the luminance determiner 124 may determine the luminance in the frame unit, using a grayscale value of the input data Din. Various methods currently known in the art may be used as a method of determining the luminance in the luminance determiner 124.

In an embodiment, the luminance determiner 124 may determine a relatively high luminance, an intermediate luminance, and a relatively low luminance in the frame unit. In an embodiment, when the OPR is 90% or more, the luminance determiner 124 may determine a luminance in a current frame as the relatively high luminance, for example. In an embodiment, when the OPR is 10% or less, the luminance determiner 124 may determine the luminance of the current frame as the relatively low luminance, for example. In an embodiment, when the OPR exceeds about 10% and is set to less than about 90%, the luminance determiner 124 may determine the luminance of the current frame as the intermediate luminance, for example. However, the above-described numerical values of about 90% and about 10% are merely illustrative, and may be experimentally and variously set.

Figure 14A:
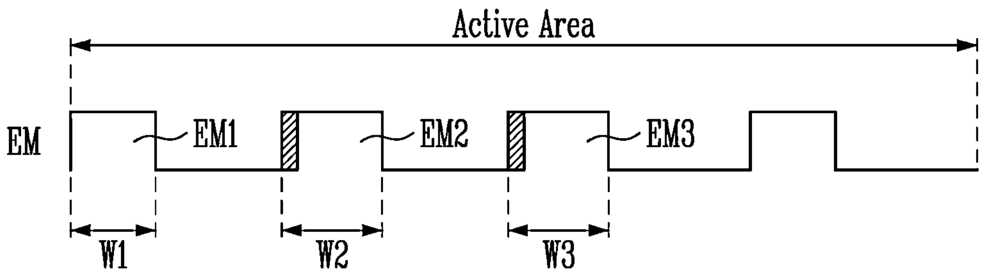
FIGS. 14A to 16B are diagrams illustrating an embodiment of disable emission control signals corresponding to a control of the timing controller.
Figure 14B:
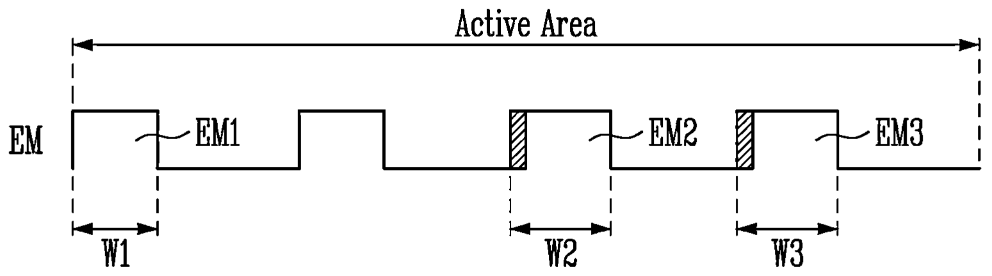

The timing controller 120 may change positions (e.g., timings, times or the like) at which a second emission control signal EM2 and a third emission control signal EM3 are supplied as shown in FIGS. 14A and 14B, corresponding to the luminance in the frame unit, which is determined in the luminance determiner 124.

In an embodiment, when the luminance of the frame is determined as the relatively high luminance in the luminance determiner 124, the timing controller 120 may set a second disable emission control signal EM supplied in the active area Active Area to have the second width W2 and set a third disable emission control signal EM supplied in the active area Active Area to have the third width W3 as shown in FIG. 14A. When the luminance of the frame is determined as the relatively high luminance, the widths of the second disable emission control signal EM and the third disable emission control signal EM may be set relatively wide such that a luminance difference corresponding to the change in image refresh rate may be minimized.

In an embodiment, when the luminance of the frame is determined as the relatively low luminance in the luminance determiner 124, the timing controller 120 may set a third disable emission control signal EM supplied in the active area Active Area to have the second width W2 and set a fourth disable emission control signal EM supplied in the active area Active Area to have the third width W3 as shown in FIG. 14B. When the luminance of the frame is determined as the relatively low luminance, the widths of the third disable emission control signal EM and the fourth disable emission control signal EM may be set relatively wide such that a flicker may be minimized.

In an embodiment, when the luminance of the frame is determined as the intermediate luminance in the luminance determiner 124, the timing controller 120 may set a second disable emission control signal EM supplied in the active area Active Area to have the second width W2 and set a fourth disable emission control signal EM supplied in the active area Active Area to have the third width W3 as shown in FIG. 7A.

Figure 15A:
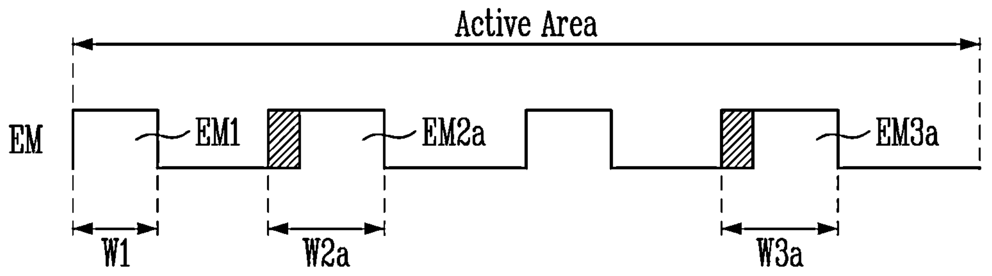
Figure 15B:
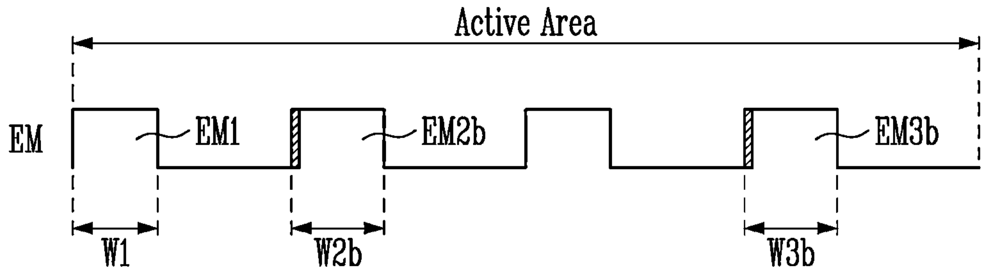

In an embodiment, when the luminance of the frame is determined as the relatively high luminance in the luminance determiner 124, the timing controller may change widths of second emission control signals EM2*a* and EM2*b* and third emission control signals EM3*a* and EM3*b* as shown in FIGS. 15A and 15B.

In an embodiment, when the luminance of the frame is determined as the relatively high luminance in the luminance determiner 124, the timing controller 120 may set a second disable emission control signal EM supplied in the active area Active Area to have a second width W2*a* and set a fourth disable emission control signal EM supplied in the active area Active Area to have a third width W3*a* as shown in FIG. 15A. The second width W2*a* may be set as a relatively wide width as compared with the second width W2 shown in FIG. 7A. The third width W3*a* may be set as a relatively wide width as compared with the third width W3 shown in FIG. 7A. The second width W2*a* and the third width W3*a* may be set as widths equal to or different from each other. When the luminance of the frame is determined as the relatively high luminance, the widths of a second emission control signal EM2*a* and a third emission control signal EM3*a* may be set relatively wide by considering the luminance difference corresponding to the change in image refresh rate.

In an embodiment, when the luminance of the frame is determined as the relatively low luminance in the luminance determiner 124, the timing controller 120 may set a second disable emission control signal EM supplied in the active area Active Area to have a second width W2*b* and set a fourth disable emission control signal EM supplied in the active area Active Area to have a third width W3*b* as shown in FIG. 15B. The second width W2*b* may be set as a narrow width as compared with the second width W2 shown in FIG. 7A. The third width W3*b* may be set as a narrow width as compared with the third width W3 shown in FIG. 7A. The second width W2*b* and the third width W3*b* may be set as widths equal to or different from each other. Also, each of the second width W2*b* and the third width W3*b* may be set as a width wider than the first width W1. When the luminance of the frame is determined as the relatively low luminance, the widths of a second emission control signal EM2*b* and a third emission control signal EM3*b* may be set narrow by considering the flicker.

In an embodiment, when the luminance of the frame is determined as the intermediate luminance in the luminance determiner 124, the timing controller 120 may set a second disable emission control signal EM supplied in the active area Active Area to have the second width W2 and set a fourth disable emission control signal EM supplied in the active area Active Area to have the third width W3 as shown in FIG. 7A. The second width W2 may be set as a width which is narrower than the second width W2*a* and is wider than the second width W2*b*. The third width W3 may be set as a width which is narrower than the third width W3*a* and is wider than the third width W3*b*.

In FIGS. 15A and 15B, it is illustrated that each of the second emission control signals EM2*a* and EMA2*b* is supplied as the second emission control signal in the active area Active Area, and each of the third emission control signals EM3*a* and EM3*b* is supplied as the fourth emission control signal in the active area Active Area. However, the disclosure is not limited thereto. In an embodiment, as shown in FIG. 15B, each of the second emission control signals EM2*a* and EM2*b* is supplied as the second emission control signal in the active area Active Area, and each of the third emission control signals EM3*a* and EM3*b* is supplied as the third emission control signal in the active area Active Area.

Figure 16A:
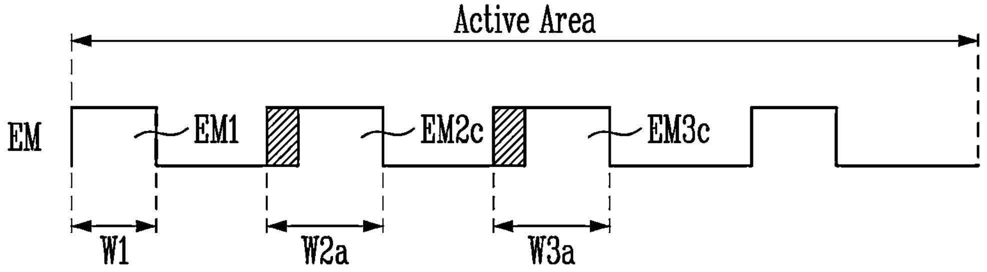
Figure 16B:
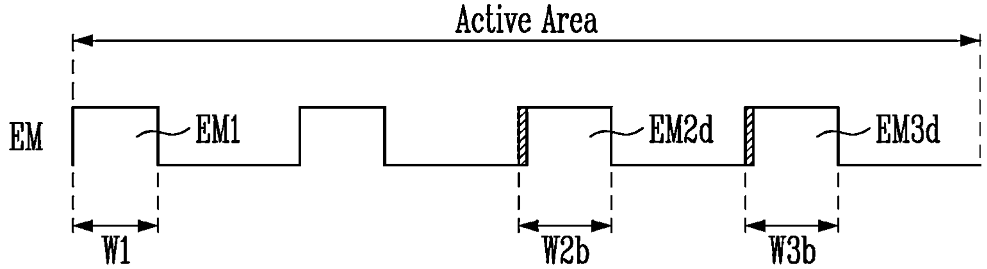

The timing controller 120 may change positions at which second emission control signals EM2*c* and EM2*d* and third emission control signals EM3*c* and EM3*d* are supplied and widths of the second emission control signals EM2*c* and EM2*d* and the third emission control signals EM3*c* and EM3*d* as shown in FIGS. 16A and 16B, corresponding to the luminance in the frame unit, which is determined in the luminance determiner 124.

In an embodiment, when the luminance of the frame is determined as the relatively high luminance in the luminance determiner 124, the timing controller 120 may set a second disable emission control signal EM supplied in the active area Active Area to have the second width W2*a* and set a third disable emission control signal EM supplied in the active area Active Area to have the third width W3*a* as shown in FIG. 16A.

In an embodiment, when the luminance of the frame is determined as the relatively low luminance in the luminance determiner 124, the timing controller 120 may set a third disable emission control signal EM supplied in the active area Active Area to have the second width W2*b* and set a fourth disable emission control signal EM supplied in the active area Active Area to have the third width W3*b* as shown in FIG. 16B.

In an embodiment, when the luminance of the frame is determined as the intermediate luminance in the luminance determiner 124, the timing controller 120 may set a second disable emission control signal EM supplied in the active area Active Area to have the second width W2 and set a fourth disable emission control signal EM supplied in the active area Active Area to have the third width W3 as shown in FIG. 7A.

Figure 17A:
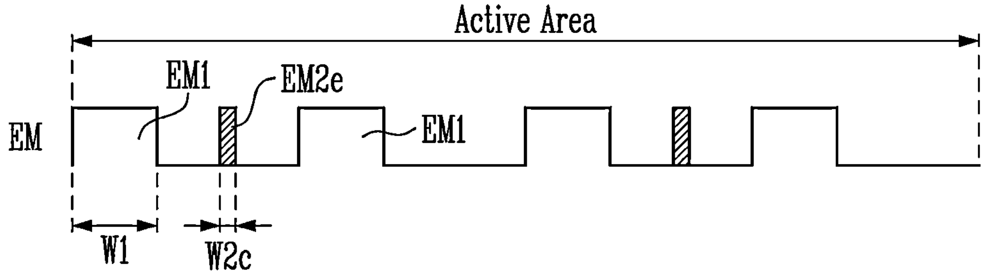
FIGS. 17A and 17B are diagrams illustrating an embodiment of an emission control signal supplied during one frame period.
Figure 17B:
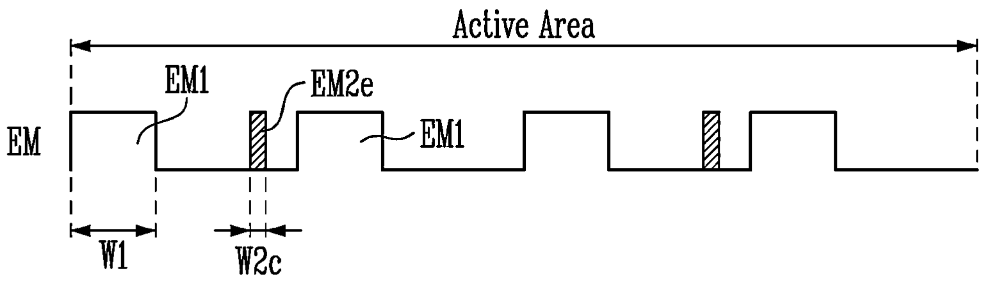

FIGS. 17A and 17B are diagrams illustrating an embodiment of an emission control signal supplied during one frame period.

Referring to FIGS. 17A and 17B, the emission driver 150 may supply a disable emission control signal EM having at least two different widths during an active area Active Area of one frame under the control of the timing controller 120.

In an embodiment, the emission driver 150 may supply a first emission control signal EM1 having a first width W1 and a second emission control signal EM2*e* having a second width W2*c*. The second width W2*c* may be set as a narrow width as compared with the first width W1.

The first emission control signal EM1 may be supplied in the same cycle (or the same interval) during the active area Active Area and a blank area Blank Area of the one frame. The second emission control signal EM2*e* may be supplied between first emission control signals EM1 during the active area Active Area of the one frame. In an embodiment, the second emission control signal EM2*e* may be supplied between a first first emission control signal EM1 and a second first emission control signal EM1 (or a period 1

Cycle) and between a third first emission control signal EM1 and a fourth first emission control signal EM1 (or a period 3 Cycle).

When the second emission control signal EM2*e* is supplied in the period 1 Cycle, an initial luminance of the active area Active Area is decreased, and accordingly, a luminance difference from a blank area Blank Area of a previous frame may be minimized. When the second emission control signal EM2*e* is supplied in the period 3 Cycle, a luminance difference in the one frame may be minimized.

Additionally, in an embodiment of the disclosure, the emission driver 150 may change a position at which the second emission control signal EM2*e* is supplied in a unit of at least one frame. In an embodiment, a second emission control signal EM2*e* shown in FIG. 17A and a second emission control signal EM2*e* shown in FIG. 17B may be supplied at different positions (or different times) during the active area Active Area. When the position at which the second emission control signal EM2*e* is supplied in the unit of at least one frame is changed, the flicker may be additionally reduced or prevented.

In the display device and the method of driving the same in accordance with the disclosure, the width of an emission control signal supplied in an active area is controlled, so that a luminance difference (or flicker) in one frame and a luminance difference caused by a change in image refresh rate may be minimized.

Also, in the display device and the method of driving the same in accordance with the disclosure, the width of an emission control signal supplied in an active area is controlled corresponding to a luminance of one frame, so that display quality may be improved.

Embodiments have been disclosed herein, and although predetermined terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in any combinations with features, characteristics, and/or elements described in connection with other embodiments unless otherwise specifically indicated. Accordingly, it will be understood by those of skill in the art that various changes in form and details may be made without departing from the spirit and scope of the disclosure as set forth in the following claims.

What is claimed is:

1. A display device comprising:

pixels each connected to a corresponding scan line among scan lines, a corresponding data line among data lines, and a corresponding emission control line among emission control lines; and an emission driver which supplies an emission control signal to the emission control lines, wherein the emission control signal includes a first emission control signal having a first width during an active area and a blank area of one frame, and a second emission control signal having a second width different from the first width during the active area of the one frame.

2. The display device of claim 1, wherein the emission driver:

supplies the first emission control signal during a writing period in which a data signal is supplied to the pixels in the active area; and supplies the second emission control signal during a period except the writing period in the active area.

3. The display device of claim 2, wherein the emission driver further supplies a third emission control signal having a third width during the period except the writing period in the active area.

4. The display device of claim 3, wherein the third width is set as a relatively wide width as compared with the first width, and the second width and the third width are set as widths equal to or different from each other.

5. The display device of claim 3, wherein the second emission control signal is supplied as a second active area emission control signal in the active area, and the third emission control signal is supplied as a fourth active area emission control signal in the active area.

6. The display device of claim 3, wherein the second emission control signal is supplied as a second active area emission control signal in the active area, and the third emission control signal is supplied as a third active area emission control signal in the active area.

7. The display device of claim 3, further comprising a timing controller which controls the emission driver, wherein the timing controller includes a storage unit in which information of the first width, the second width, and the third width is stored.

8. The display device of claim 7, wherein the timing controller further includes a luminance determiner which determines a luminance in a unit of the one frame, corresponding to input data.

9. The display device of claim 8, wherein the timing controller changes positions at which the second emission control signal and the third emission control signal are supplied, corresponding to the luminance.

10. The display device of claim 9, wherein, when the luminance of the one frame is determined as a relatively high luminance, the timing controller supplies the second emission control signal as a second active area emission control signal in the active area, and supplies the third emission control signal as a third active area emission control signal in the active area.

11. The display device of claim 9, wherein, when the luminance of the one frame is determined as a relatively low luminance, the timing controller supplies the second emission control signal as a third active area emission control signal in the active area, and supplies the third emission control signal as a fourth active area emission control signal in the active area.

12. The display device of claim 8, wherein the timing controller changes widths of the second emission control signal and the third emission control signal, corresponding to the luminance.

13. The display device of claim 12, wherein the timing controller increases the widths of the second emission control signal and the third emission control signal when the luminance of the one frame is determined as a relatively high luminance, and decreases the widths of the second emission control signal and the third emission control signal when the luminance of the one frame is determined as a relatively low luminance.

14. The display device of claim 2, wherein the second width is set as a width narrower than the first width, and the emission driver supplies the first emission control signal in a predetermined cycle during the active area and the blank area of the one frame.

15. The display device of claim 14, further comprising a timing controller which controls the emission driver, wherein the timing controller changes a position at which the second emission control signal is supplied in a unit of a frame.

16. The display device of claim 1, wherein the second width is set as a relatively wide width as compared with the first width.

17. A method of driving a display device including a pixel of which emission time is controlled corresponding to an emission control signal, the method comprising:

supplying an emission control signal having a first width and an emission control signal having a second width different from the first width during an active area of one frame; and supplying the emission control signal having the first width during a blank area of the one frame.

18. The method of claim 17, wherein the second width is set as a relatively wide width as compared with the first width.

19. The method of claim 17, wherein a length of the second width is changed corresponding to a luminance of the one frame.

20. The method of claim 17, wherein the emission control signal having the first width is supplied in a predetermined cycle in the active area and the blank area, and wherein the second width is set as a width narrower than the first width, and a position at which the emission control signal having the second width is supplied is changed in a unit of a frame.

* * * * *